(12) United States Patent
Hoche et al.

(10) Patent No.: US 7,228,825 B2
(45) Date of Patent: Jun. 12, 2007

(54) TWO-STROKE ENGINE ASSEMBLY

(75) Inventors: Florian Hoche, Waiblingen (DE); Niels Kunert, Sindelfingen (DE); Horst Denner, Strümpfelbach (DE); André Prager, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/281,412

(22) Filed: Nov. 18, 2005

(65) Prior Publication Data

US 2006/0107912 A1  May 25, 2006

(30) Foreign Application Priority Data

Nov. 20, 2004  (DE) .................. 10 2004 056 149

(51) Int. Cl.
*F02B 33/04* (2006.01)
(52) U.S. Cl. ................. 123/73 PP; 123/73 C
(58) Field of Classification Search ........... 123/73 PP, 123/73 C, 73 AA, 74 A, 65 A, 65 P, 73 D
See application file for complete search history.

(56) References Cited

U.S. PATENT DOCUMENTS

| | | | | |
|---|---|---|---|---|
| 6,257,179 B1 * | 7/2001 | Uenoyama et al. | ....... | 123/65 R |
| 6,352,058 B1 * | 3/2002 | Yuasa et al. | ............. | 123/73 R |
| 6,418,891 B2 * | 7/2002 | Kobayashi | ............. | 123/73 PP |
| 6,460,494 B1 * | 10/2002 | Cobb, Jr. | ................ | 123/73 PP |
| 6,640,755 B2 * | 11/2003 | Araki | ..................... | 123/73 PP |
| 6,662,766 B2 * | 12/2003 | Araki et al. | ............ | 123/73 PP |
| 6,889,637 B2 | 5/2005 | Rosskamp | | |
| 6,962,132 B2 * | 11/2005 | Hoche et al. | ............. | 123/73 A |
| 2003/0106508 A1 * | 6/2003 | Rosskamp | ............. | 123/73 PP |

\* cited by examiner

*Primary Examiner*—Marguerite McMahon
(74) *Attorney, Agent, or Firm*—Walter Ottesen (57) ABSTRACT

A two-stroke engine includes an air channel for supplying substantially fuel-free combustion air and a mixture channel for supplying an air/fuel mixture. The air channel and the mixture channel connect the cylinder of the two-stroke engine to an air filter. A section of the mixture channel and a section of the air channel are guided in a common component. In order to prevent induction of mixture into the air channel, the length (a) of the mixture channel and the length (b) of the air channel are so matched to each other that the pressure wave in the air channel, which forms during operation, oscillates in phase with the pressure wave formed in the mixture channel. The length (a) of the mixture channel is matched to an optimal fuel induction via the fuel opening. A method for tuning the two-stroke engine provides that the length (a) of the mixture channel is matched to an optimal fuel discharge from the fuel opening in a first step and, in a second step, the length (b) of the air channel is so matched to the length (a) of the mixture channel that the pressure wave in the air channel and the pressure wave in the mixture channel oscillate in phase during operation of the two-stroke engine.

11 Claims, 7 Drawing Sheets

TWO-STROKE ENGINE ASSEMBLY

CROSS REFERENCE TO RELATED APPLICATION

This application claims priority of German patent application no. 10 2004 056 149.4, filed Nov. 20, 2004, the entire content of which is incorporated herein by reference.

FIELD OF THE INVENTION

The invention relates to a two-stroke engine assembly including an engine assembly in a portable handheld work apparatus such as a motor-driven chain saw, a cutoff machine or the like. The invention also relates to a method of tuning a two-stroke engine.

BACKGROUND OF THE INVENTION

U.S. Pat. No. 6,889,637 discloses a two-stroke engine having a cylinder which is connected to an air filter via an air channel and a mixture channel. The air channel and the mixture channel are guided in common in a carburetor and are separated from each other by a partition wall. During operation of the two-stroke engine, pressure waves develop in the channels because of the opening and closing of the air channel and the mixture channel. Especially during full load operation of the two-stroke engine, a complete separation of the air channel and mixture channel is wanted. It can, however, occur that fuel is drawn by suction from the mixture channel into the air channel because of an underpressure in the air channel as a consequence of leaks, especially, in the area of the partition wall. The air, which is conducted through the air channel to the cylinder, is used for scavenging the combustion chamber. Fuel drawn by suction into the intake channel can therefore escape uncombusted through the outlet. In this way, the exhaust-gas values of the two-stroke engine deteriorate. A complete sealing of the partition wall is only possible with a high constructive complexity.

It has been shown that during operation of the two-stroke engine, the fuel discharge from the fuel opening into the mixture channel can be deteriorated by pressure waves formed in the mixture channel. The deteriorated fuel discharge through the fuel opening can lead to an uneven running of the two-stroke engine and to a deteriorated acceleration performance.

SUMMARY OF THE INVENTION

It is an object of the invention to provide a two-stroke engine assembly which has good exhaust-gas values. In addition, it is an object of the invention to provide a two-stroke engine assembly which exhibits a quiet running performance. Also, a method for tuning a two-stroke engine assembly is provided via which the exhaust-gas values of the engine can be reduced.

The two-stroke engine assembly of the invention includes: a cylinder; a piston disposed in the cylinder to undergo an up and down reciprocating movement; the piston and the cylinder conjointly defining a combustion chamber; an air filter; an air channel for supplying substantially fuel-free combustion air to the cylinder with a first pressure wave developing in the air channel during operation of the two-stroke engine; a mixture channel for supplying an air/fuel mixture to the cylinder with a second pressure wave also developing in the mixture channel during operation of the engine; the air channel and the mixture channel connecting the cylinder to the air filter; a component common to the air channel and the mixture channel; a section of the air channel and a section of the mixture channel being guided in the component; the air channel being of a first length and the mixture channel being of a second length; the first length and the second length being matched to each other so as to cause the first and second pressure waves in the air channel and the mixture channel to oscillate in phase.

The pressure differences in the mixture channel and the air channel during operation of the engine can be reduced because the pressure waves in the air channel and mixture channel oscillate in phase during operation of the two-stroke engine. In this way, it is prevented that the mixture is drawn by suction from the mixture channel into the air channel because of pressure differences between the air channel and the mixture channel. For this reason, no high sealing requirements need be imposed on a partition wall mounted between the air channel and the mixture channel. For this reason, the two-stroke engine can be simply configured.

Advantageously, the mixture channel and the air channel each have a wall on which the pressure wave is reflected. The position of the wall on which the pressure wave is reflected, which is formed in the mixture channel, and the position of the wall, on which the pressure wave (which propagates in the air channel) is reflected, are so matched to each other that the pressure waves, which form in the mixture channel and the air channel, have approximately the same amplitudes. Approximately the same amplitudes means that these are amplitudes whose values deviate from each other by less than 20%. In this way, the pressure differences between the air channel and the mixture channel can be further reduced. It can, however, also be advantageous that the positions of the walls are so matched to each other that the forming pressure waves in the mixture channel and in the air channel have different amplitudes. Here it is especially provided that the amplitude of the pressure wave, which forms in the air channel, is less than the amplitude of the pressure wave which forms in the mixture channel. In this way, it can be achieved that especially in the underpressure range, the pressure in the air channel is higher than the pressure in the mixture channel so that no mixture is drawn by suction into the air channel, instead, air can be drawn by suction from the air channel into the mixture channel.

The invention is especially provided for a two-stroke engine wherein the air channel and mixture channel are separated from each other by a partition wall in a common component. The common component is especially a carburetor or an intermediate flange.

The mixture channel and/or the air channel are extended into the air filter in order to provide a small structural size of the two-stroke engine and to simultaneously make possible a good matching of the air channel and mixture channel. The common component is advantageously the air filter. It is practical that the air filter include a filter material which separates a raw side from a clean side. The partition wall is mounted at the clean side of the air filter.

To achieve a small structural size of the two-stroke engine, a section of a channel extends from the air filter to the cylinder transversely to the flow direction. The structural size of the two-stroke engine between cylinder and air filter can be thereby minimized. A length of the air channel and/or mixture channel, which is additionally needed for a good matching, is mounted in a direction transversely to the direct connection of air filter and cylinder with minimized spacing of the air filter and the cylinder and, in this way, can optimally utilize the available structural space. In order to be able to adapt the length of the air channel and/or of the mixture channel in a simple manner to a two-stroke engine, it is provided that a section, which runs transversely to the flow direction from the air filter to the cylinder, is guided in a chamber into which a wall section having a free end projects. The section of the channel extends around the free end. To change the length of the section of the channel, the wall section only need be lengthened or shortened so that the free end can project more or less further into the chamber. In this way, the length of the air channel and/or of the mixture channel is changed without a change being necessary at the outer dimensions of the chamber. In this way, an adaptation of a channel length to a two-stroke engine can be achieved with little constructive complexity as well as with slight adaptations to the tools used for the manufacture.

A section of a channel, which runs transversely to the flow direction from the air filter to the cylinder, is mounted especially on the air filter. Advantageously, a wall is mounted in the air filter at which the pressure wave is reflected. Especially, a wall at which a pressure wave is reflected is a wall of the air filter housing. The air filter can be simply configured so that a housing wall of the air filter housing can be used for the reflection of a pressure wave. The adaptation of the amplitudes of the pressure waves to each other can take place via an adaptation of the position of the second wall in the air filter. Advantageously, the section of a channel, which runs transversely to the flow direction from the air filter to the cylinder, is delimited by an intermediate cover on the side facing away from the air filter base. This intermediate cover lies against the partition wall and against the wall sections. In this way, and in a simple manner, a delimiting of the section of the channel is achieved. The filter material is especially arranged on the side of the intermediate cover facing away from the air filter base.

The air channel opens with an air inlet at the cylinder and the mixture channel opens with a mixture inlet at the cylinder and the air inlet and the mixture inlet are controlled by the piston. In this way, a control of the opening and closing of the channels is achieved without additional components. At the same time, a compact configuration is realized.

The length of the mixture channel is matched to an optimal fuel induction through the fuel opening in a two-stroke engine having a cylinder in which a combustion chamber is formed which, in turn, is delimited by a reciprocating piston and which two-stroke engine has a mixture channel which connects the cylinder to an air filter and into which a fuel opening opens for supplying fuel via which fuel is drawn by suction into the mixture channel.

By matching the length of the mixture channel, the phase position of the pressure wave, which is formed in the mixture channel, can be changed. In this way, a defined underpressure can be achieved in the region of the fuel opening so that an adequate fuel quantity is supplied to the combustion chamber especially at full load operation. With a matching of the length of the mixture channel, an adequate fuel supply is ensured in a simple manner.

The two-stroke engine has an air channel for supplying air which is substantially free of fuel and which connects the cylinder to the air filter. The length of the air channel is so matched to the length of the mixture channel that the pressure wave in the mixture channel, which is formed during operation, oscillates in phase with the pressure wave in the air channel. The substantially fuel-free air supplied via the air channel can be used for scavenging the exhaust gases out of the combustion chamber. The substantially fuel-free air advantageously separates the outflowing exhaust gases from the mixture afterflowing into the combustion chamber so that no uncombusted mixture can escape from the combustion chamber. A good combustion in the subsequent cycle can be achieved in that the exhaust gases are substantially completely removed from the combustion chamber. The exhaust-gas values of the two-stroke engine are reduced by the avoidance of the scavenging of the uncombusted mixture. The pressure differences between the air channel and the mixture channel are minimized by the matching of the lengths of the air channel and mixture channel. In this way, it is avoided that the mixture from the mixture channel is drawn by suction into the air channel and is flushed uncombusted out of the combustion chamber and that the exhaust-gas values of the two-stroke engine thereby deteriorate.

The mixture channel and the air channel each have a wall at which the pressure waves are reflected and the positions of the walls are so matched to each other that the pressure waves have approximately the same amplitudes. In this way, the pressure differences between the air channel and the mixture channel can be reduced. It can, however, be advantageous that the mixture channel and the air channel each have a wall at which the pressure waves are reflected and the positions of the walls are so matched to each other that the amplitudes of a pressure wave (especially the amplitude of the pressure wave forming in the mixture channel) are greater than the amplitudes of the other pressure wave (especially the pressure wave in the air channel). In this way, a defined induction of air into the mixture channel is achieved. An induction of the mixture into the air channel is thereby precluded.

A two-stroke engine has the following: a cylinder in which a combustion chamber is configured which is delimited by an upwardly and downwardly moving piston; a mixture channel into which a fuel nozzle opens; and, an air channel for supplying substantially fuel-free combustion air with the air channel and the mixture channel connecting the cylinder to an air filter. A method for tuning this two-stroke engine includes, in a first step, matching the length of the mixture channel to an optimal fuel discharge from the fuel nozzle. In a second step, the length of the air channel is so matched to the length of the mixture channel that, during operation of the engine, the pressure wave in the air channel and the pressure wave in the mixture channel oscillate in phase.

The matching of the length of the mixture channel in the first step leads to a good discharge of fuel from the fuel opening. The pressure differences between the two channels are minimized by matching the air channel to the length of the mixture channel in the second step and, in this way, the problem of the induction of mixture into the air channel is reduced.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
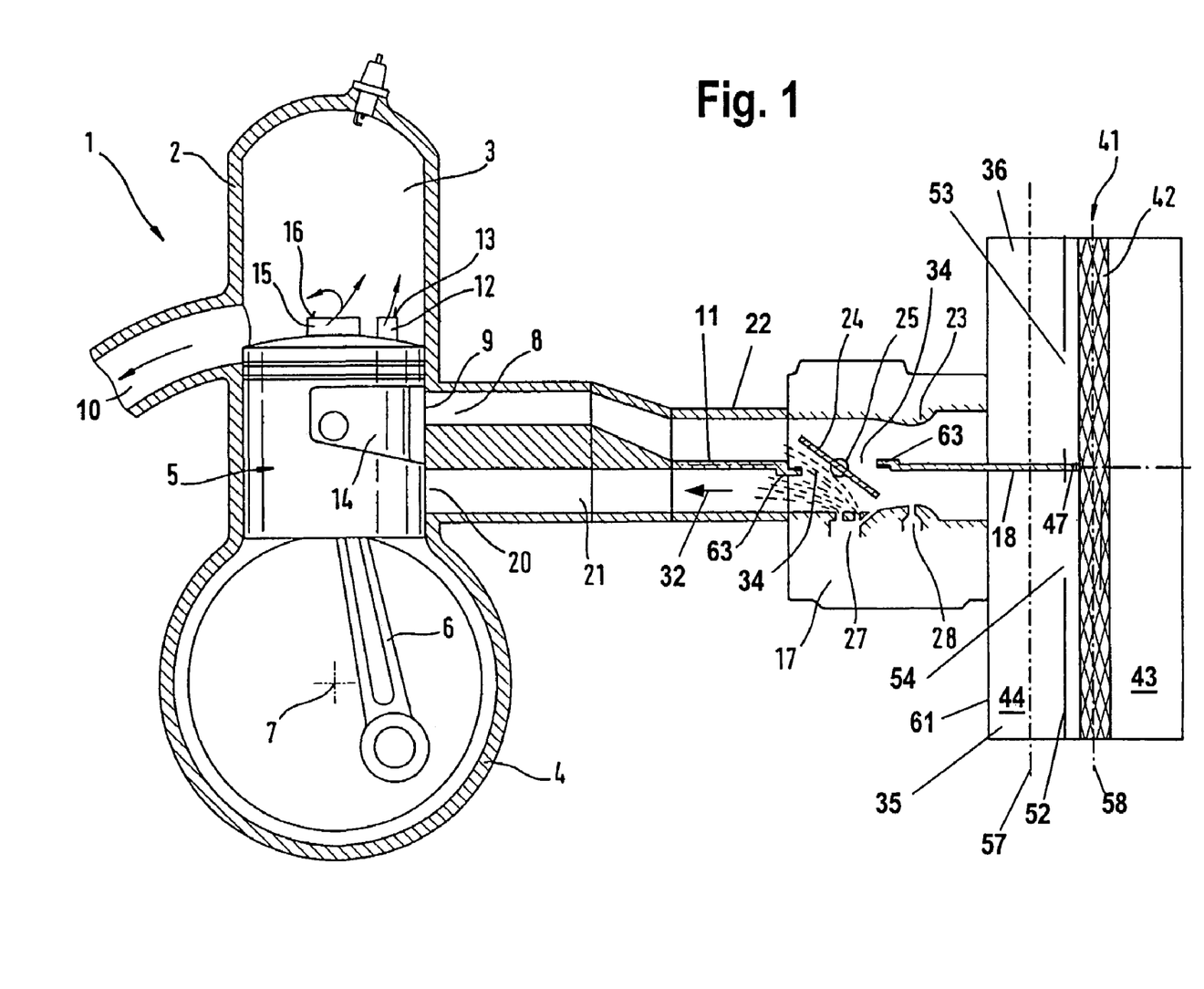
FIG. 1 is a side elevation view, partially in section, of a two-stroke engine connected by an intermediate channel to an air filter.

The two-stroke engine 1 shown in FIG. 1 includes a cylinder 2 in which a combustion chamber 3 is formed. The combustion chamber 3 is delimited by the cylinder 2 and a piston 5 moving upwardly and downwardly in the cylinder 2. The piston 5 drives a crankshaft 7 via a connecting rod 6 and the crankshaft 7 is rotatably journalled in a crankcase 4. The cylinder 2 has four transfer channels (12, 15) of which two are shown in FIG. 1. The additional two transfer channels are arranged so as to lie opposite the transfer channels 12 and 15 which are shown. The outlet-remote transfer channel 12 opens with a transfer window 13 into the combustion chamber 3 and the outlet-near transfer channel 15 opens with a transfer window 16. The transfer windows 13 and 16 are open toward the combustion chamber 3 in the region of bottom dead center of the piston 5. In the piston position shown, the transfer channels 12 and 15 connect the crankcase 4 to the combustion chamber 3. An outlet 10 leads out of the combustion chamber 3.

A mixture channel 21 opens with a mixture inlet 20 at the cylinder 2 and an air channel 8 opens with an air inlet 9 at the cylinder 2. The air inlet 9 is arranged on the side of the mixture inlet 20 facing toward the combustion chamber 3. The air channel 8 and the mixture channel 21 connect the cylinder 2 to an air filter 41. The piston 5 has at least a piston pocket 14 which connects the air inlet 9 to the transfer windows 13 and 16 in the region of top dead center of the piston 5.

The air channel 8 and the mixture channel 21 are guided between the cylinder 2 and the air filter 41 in a common intermediate flange 22 and are also guided in a carburetor 17. In the carburetor 17 and in the intermediate flange 22, the air channel 8 and the mixture channel 21 are separated from each other by a partition wall 11. The partition wall runs from the air filter 41 to the cylinder 2 approximately parallel to the flow direction 32.

In the carburetor 17, a main fuel opening 28 opens into the mixture channel 21 at a venturi section 23. Additional fuel openings 27 are arranged downstream of the main fuel opening 28 and open into the mixture channel 21. In the carburetor 17, a throttle flap 24 is pivotally journalled on a throttle shaft 25 approximately at the elevation of the fuel openings 27. The throttle flap is at the half-open position in FIG. 1. At this position of the throttle flap 24, openings 34 are formed between the throttle flap 24 and the sections of the partition wall 11, which extend from the throttle flap 24, upstream and downstream of the throttle shaft 25. In part load operation, fuel can get from the mixture channel 21 through the openings 34 into the air channel 8. In this way, pressure differences in the air channel 8 and in the mixture channel 21 are compensated. At full load, the throttle flap 24 is completely opened and lies at the edges 63 of the partition wall 11. The air channel 8 is thereby separated from the mixture channel 21.

Figure 4:
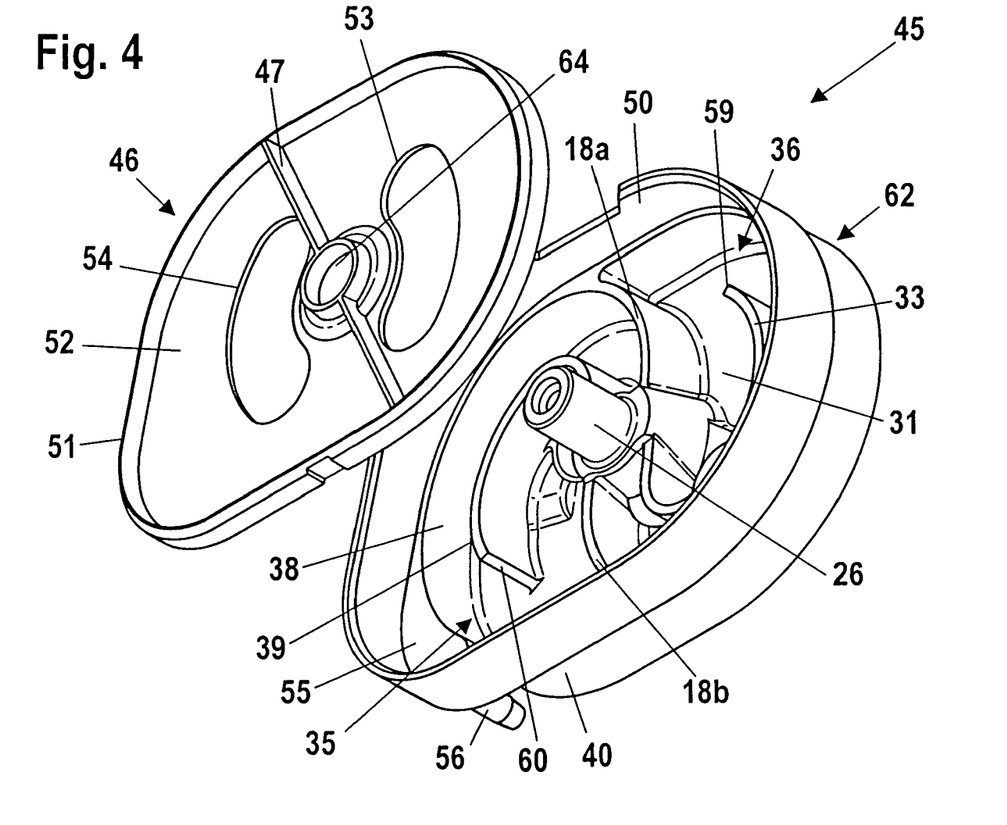
FIG. 4 is an exploded perspective view of the air filter of the two-stroke engine.

The air filter 41 has a filter material 42 which partitions a raw side 43 from a clean side 44. The air channel 8 and the mixture channel 21 connect at the clean side 44. The partition wall 11 is extended into the air filter 41. The partition wall section 18, which is arranged in the air filter 41, partitions the clean side 44 of the air filter 41 into a first chamber 35 and a second chamber 36. In the first chamber 35, a section of the mixture channel 21 runs and in the second chamber 36, a section of the air channel 8 runs. The sections of the air channel 8 and the mixture channel 21, which are arranged in the air filter housing, are delimited by a base plate 52 of an intermediate cover 46 (FIG. 4). The intermediate cover 46 is arranged between the air filter base 61 at which the carburetor 17 is fixed and the filter material 42. In the section delimiting the chamber 35, the base plate 52 has an opening 54 and, in the section, which delimits the chamber 36, the base plate 52 has an opening 53. Air can be drawn by suction through the openings 53 and 54. The base plate 52 is arranged at a small spacing from the filter material 42. Between the base plate 52 and the filter material 42, the partition wall section 47, which is fixed at the base plate 52, extends and partitions the mixture channel 21 from the air channel 8.

The filter material 42 extends essentially in a plane 58. The sections of the air channel 8 and the mixture channel 21, which are guided in the chambers 35 and 36, extend essentially in a plane 57 which lies parallel to the air filter base 61 and parallel to the plane 58 of the filter material 42.

Figure 2:
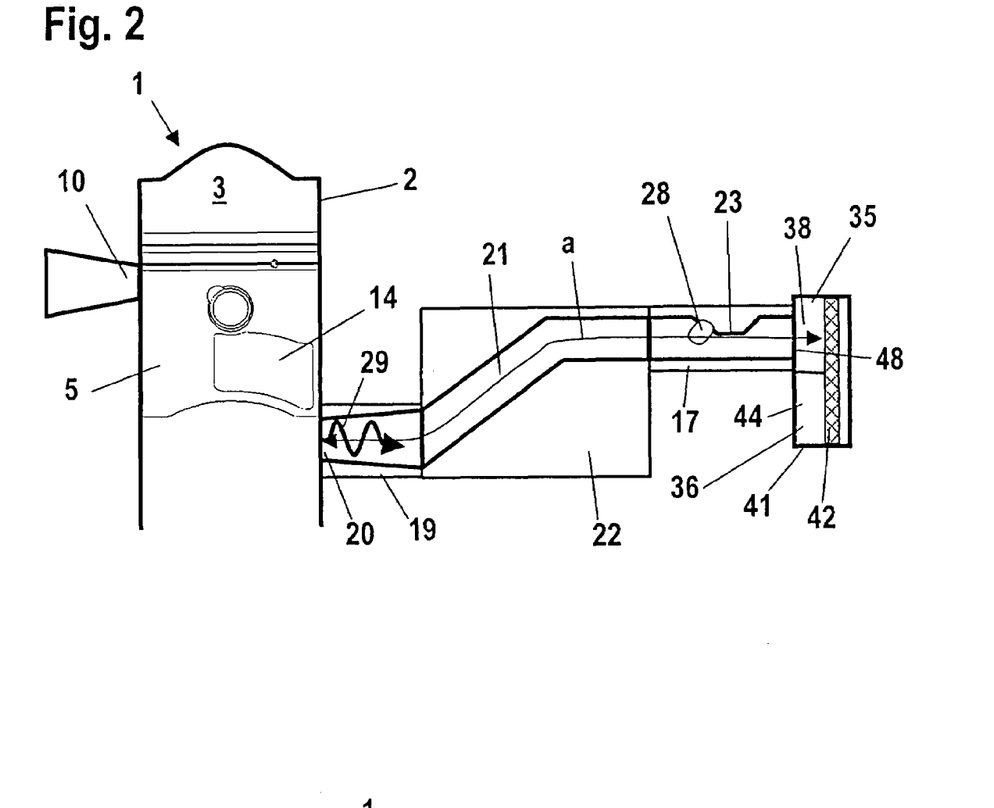
FIG. 2 is a simplified schematic of a two-stroke engine showing the mixture channel.
Figure 3:
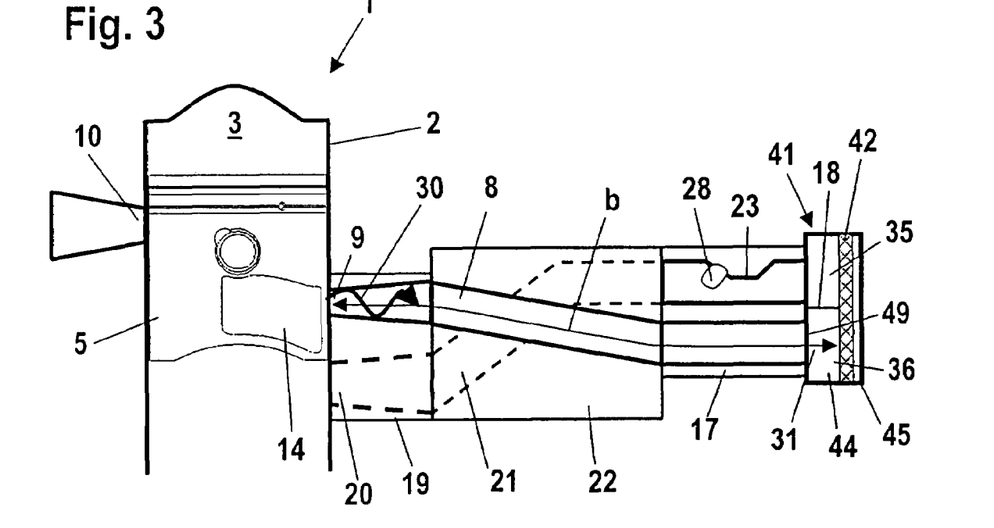
FIG. 3 is a simplified schematic of a two-stroke engine showing the mixture channel and the air channel connected to an air filter.

FIG. 2 shows the two-stroke engine 1 with the mixture channel 21. In the simplified schematic, the throttle flap 24 as well as the fuel openings 27 are omitted. Also, the air channel 8 is not shown. The mixture channel 21 has a length (a) from the mixture inlet 20 to the filter material 42. The length (a) then includes also a section 38 of the mixture channel 21. This section 38 is arranged in the air filter 41 in the first chamber 35. Between the mixture inlet 20 and the intermediate flange 22, the mixture channel 21 is guided in a cylinder flange 19 which is manufactured as one piece with the cylinder 2. During operation of the two-stroke engine 1, a pressure wave 29 forms in the mixture channel 21 starting from the mixture inlet 20. The pressure wave 29 arises because of the opening and closing of the mixture inlet 20 by the piston 5. The pressure wave 29 propagates in the entire mixture channel 21. An intensely fluctuating pressure is thereby present also at the main fuel opening 28. In order to ensure that an adequate quantity of mixture can arrive in the crankcase 4 of the two-stroke engine 1, the length (a) of the mixture channel 21 is matched to an optimal induction of fuel through the main fuel opening 28. In this way, a defined underpressure is achieved at the main fuel opening 28 when the mixture inlet 20 is opened. The matching can take place in a simple manner via the change of the length (a) of the mixture channel 21. In FIG. 3, the air channel 8 is also shown. On the two-stroke engine 1, the air channel 8 is guided on the side of the mixture channel 21 facing away from the crankcase 4 (not shown in FIG. 3) and facing toward the cylinder 2. On the air filter 41, the air channel 8 lies on the side of the mixture channel 21 which faces away from the cylinder 2 and faces toward the crankcase 4. In this way, an adequately large structural space is made available for the mixture supply device which supplies the fuel openings 27 and 28. The channels 8 and 21 are guided past each other in the intermediate flange 22.

The air channel 8 has a length (b) from the air inlet 9 to the filter material 42. The length (b) includes also the length of a section 31 of the air channel 8 which is arranged in the second chamber 36. With the opening and closing of the air inlet 9, a pressure wave 30 forms in the air channel 8 which propagates in the entire air channel 8. The pressure wave 30 is dependent upon the length (b) of the air channel 8. The length (b) of the air channel 8 is so matched to the length (a) of the mixture channel 21 that the pressure waves 29 and 30, which form during operation in the air channel 8 and the mixture channel 21, oscillate in phase. The in-phase condition of the pressure waves 29 and 30 causes the pressure differences in the air channel 8 and the mixture channel 21 to be slight. In this way, it can be prevented that fuel from the mixture channel 21 is drawn by suction into the air channel 8 in the components wherein the air channel 8 and the mixture channel 21 are guided in common, that is, in the intermediate flange 22, the carburetor 17 and on the clean side 44 of the air filter 41. The difference of the lengths between the air channel 8 and the mixture channel 21 is dependent upon the control times of the mixture inlet 20 and the air inlet 9. The length (a) of the mixture channel 21 need not perforce be less than the length (b) of the air channel 8. For the same lengths of the air channel 8 and mixture channel 21, an in-phase condition of the air channel 8 and the mixture channel 21 can also occur at specific control times. Air channel 8 and mixture channel 21 are extended into the housing 45 of the air filter 41. In the housing 45 of the air filter 41, the flow direction runs transversely in the channels (8, 21) especially approximately perpendicularly to the flow direction 32 (shown in FIG. 1) from the air filter 41 to the cylinder 2. Only little construction space is needed for the additional length. Especially, the channels (8, 21) are guided so as to have a spiral configuration.

FIG. 4 shows a exploded view of the housing 45 of the air filter 41. The housing 45 has a lower shell 62 wherein the sections 31 and 38 of the air channel and mixture channel are guided. The two sections 31 and 38 are partitioned from each other by the partition wall 18. The partition wall 18 has two sections (18a, 18b) which extend up to the wall 40 of the lower shell 62 on both sides of a dome 26 for receiving a threaded fastener. The dome 26 lies perpendicular to the planes 57 and 58 shown in FIG. 1 and serves to fix the cover (not shown) of the air filter housing 45. In the first chamber 35, a wall section 39 extends whose free end 60 projects into the chamber 35. The section 38 of the mixture channel 21 is guided around the wall section 39. Likewise, a wall section 33 is arranged in the second chamber 36. The free end 59 of the wall section 33 projects into the chamber 36. The wall sections 33 and 39 and the partition wall 18 extend approximately over half the elevation of the dome 26. The lower shell 62 has an edge 50 which is radially offset outwardly with respect to a wall 40 of the lower shell 62 and so forms a shoulder 55 which lies in a plane with the upper end of the wall sections 33 and 39 and the partition wall 18. A dome 56 projects from the shoulder 55 in the direction of the air filter base 61 not shown in FIG. 4. In the region of this dome 56, the shoulder 55 is configured so as to be widened.

The housing 45 has an intermediate cover 46 having a base plate 52 and a center opening 64. With the intermediate cover 46 mounted, the dome 26 projects through the opening 64. The base plate 52 lies against the edge 55, the edge sections 33 and 39 and the partition wall 18 and so seals the chambers 35 and 36. The base plate 52 has the opening 54 in the region of the first chamber 35 and has the opening 53 in the region of the chamber 36. The intermediate cover 46 has a peripherally-extending edge 51 on the end facing away from the lower shell 62. When the intermediate cover 46 is mounted on the lower shell 62, the edge 51 lies against the edge 50 of the lower shell 62. On the side, which faces away from the lower shell 62, the intermediate cover 46 has a partition wall section 47 which extends between the openings 53 and 54 and is guided completely around the opening 64 and, in this way, forms a guide for the dome 26 for receiving a threaded fastener. On the side facing away from the lower shell 62, the filter material 42 (not shown in FIG. 4) is placed on the edge 51 and the partition wall 47. The filter area can be completely utilized because of the distance of the filter material to the base plate 52 formed by the edge 51 and the partition wall 47.

Figure 5:
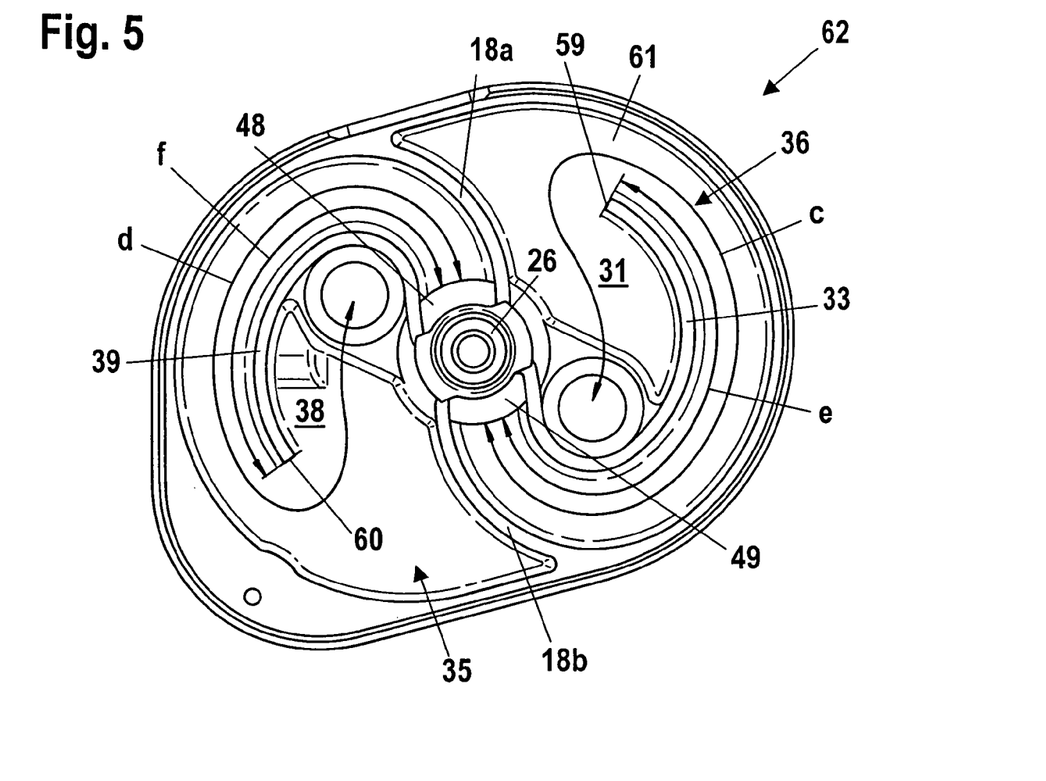
FIG. 5 is a plan view of the lower shell of the housing of an air filter.

As FIG. 5 shows, the air channel 8 opens with an opening 49 into the chamber 36 at the air filter base 61. The opening 49 lies approximately opposite to the opening 53 (shown in FIG. 4) in the intermediate cover 46 so that the opening 49 is arranged at one end of the section 31 of the air channel 8 and the opening 53 is arranged at the other, opposite-lying end. The section 31 of the air channel 8 is configured in the second chamber 36 and has a length (c). By increasing the length (e) of the wall section 33 in the second chamber 36, the length (c) of the section 31 can be increased and can be made smaller by shortening the wall section 33. In this way, with a simple change of the length (e) of the wall section 33, the length (c) of the air channel 8 can be adapted.

The mixture channel 21 opens with an opening 48 at the filter base 61 and this opening 48 lies opposite to the opening 54 in the intermediate cover 46. The length (d) of the section 38 of the mixture channel 21, which is configured in the first chamber 35, can be changed by changing the length (f) of the wall section 39 projecting into the first chamber 35. The section 38 of the mixture channel 21 is guided about the free end 60 of the wall section 39. Likewise, the section 31 of the air channel 8 is guided around the free end 59 of the wall section 33. By changing the lengths (e, f) of the wall sections 33 and 39, the lengths (c) and (d) of the sections 31 and 38 of the air channel and mixture channel can be easily changed and, in this manner, the lengths (a) and (b) of mixture channel and air channel can be matched to each other. The sections 31 and 38 are guided in the air filter 41.

Figure 6:
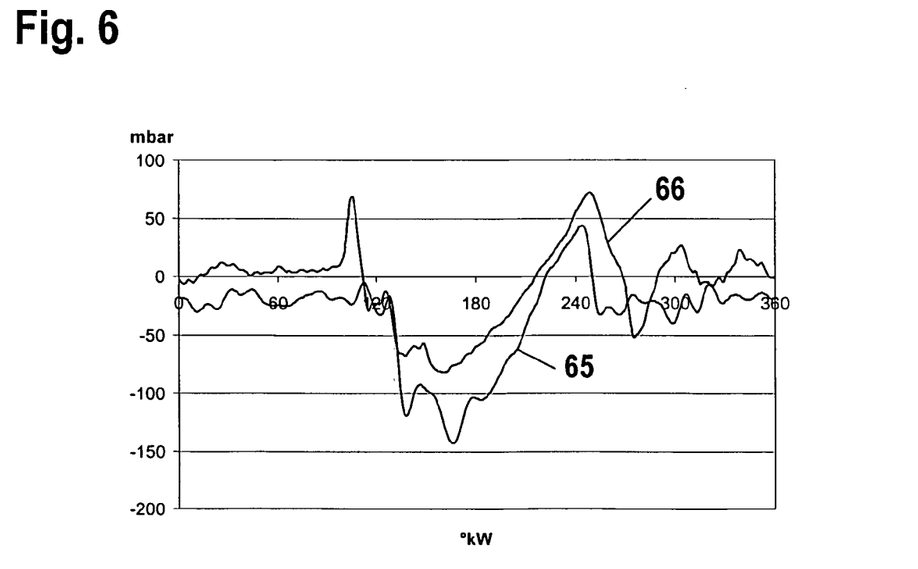
FIG. 6 is a graph showing the pressure course in the mixture channel and the pressure course in the air channel over one revolution of the crankshaft.

In FIG. 6, the pressure course 65 in the mixture channel 21 and the pressure course 66 in the air channel 8 are shown as a function of one revolution of the crankshaft 7. The diagram shows the pressure courses before the matching of lengths (a, b) of mixture channel 21 and air channel 8. The pressure in the air channel 8 and in the mixture channel 21 drops when opening the air channel 8 and the mixture channel 21 at a crankshaft angle of slightly more than 120°. The pressure drop in the air channel 8 is then less intense so that the curve 66 lies above the curve 65. The pressure increases starting at a crankshaft angle of approximately 160°. Up to a crankshaft angle of approximately 240°, air inlet 9 and mixture inlet 20 are closed by the piston 5. The pressure falls off when opening the air inlet 9 and mixture inlet 20 at a crankshaft angle of approximately 240°. The air channel pressure 66 drops less intensely than the pressure 65 in the mixture channel 21. The pressure 66 in the air channel 8 drops at a crankshaft angle of approximately 270° below the pressure 65 in the mixture channel 21. In this way, the mixture from the mixture channel 21 can be drawn into the air channel 8 by suction when there are leaks.

Figure 7:
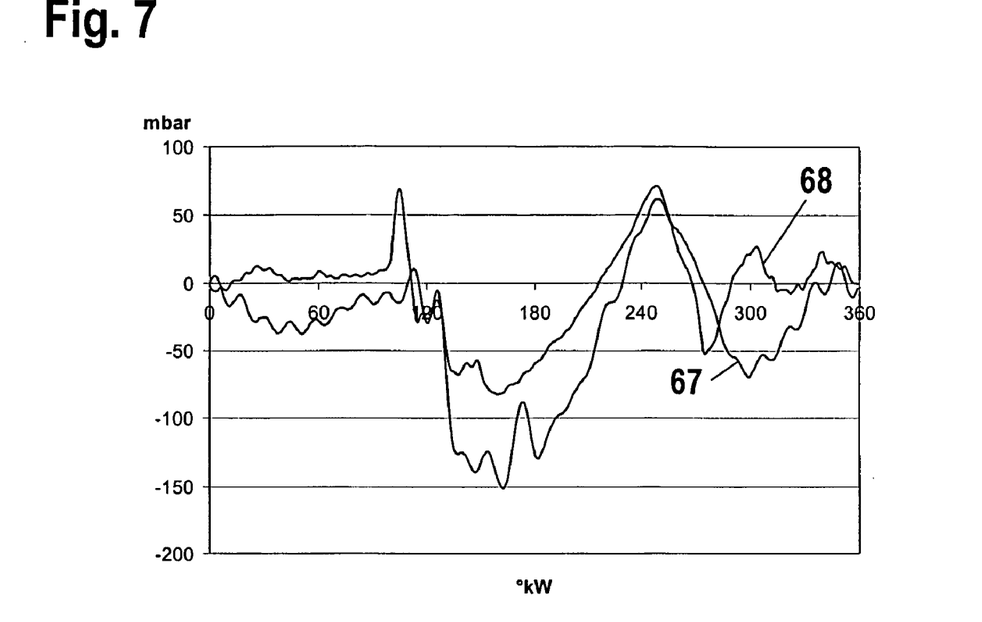
FIG. 7 is a graph showing the pressure in the mixture channel and the pressure in the air channel after matching the length of the mixture channel to an optimal induction of fuel through the fuel opening.

FIG. 7 shows the pressure in the mixture channel 21 and the pressure 68 in the air channel 8 after the matching of the length of the mixture channel 21 to an optimal induction of fuel via the fuel opening. The pressure 67 in the mixture channel 21 lies below the pressure 68 in the air channel 8 while the air inlet 9 and the mixture inlet 20 are open, that is, at a crankshaft angle of approximately 120° to 240°. At approximately 240° crankshaft angle, the pressure 68 in the air channel 8, however, drops with greater intensity than the pressure 67 in the mixture channel 21 when the air channel 8 and the mixture channel 21 are closed so that a large pressure difference results between air channel 8 and mixture channel 21 and mixture from the mixture channel 21 can be drawn by suction into the air channel 8. The pressure 68 in the air channel 8 has already again increased for a crankshaft angle of approximately 300° while an underpressure is still present in the mixture channel 21. The pressure waves in the air channel 8 and mixture channel 21 oscillate here approximately in phase so that large pressure differences between the air channel 8 and the mixture channel 21 result.

Figure 8:
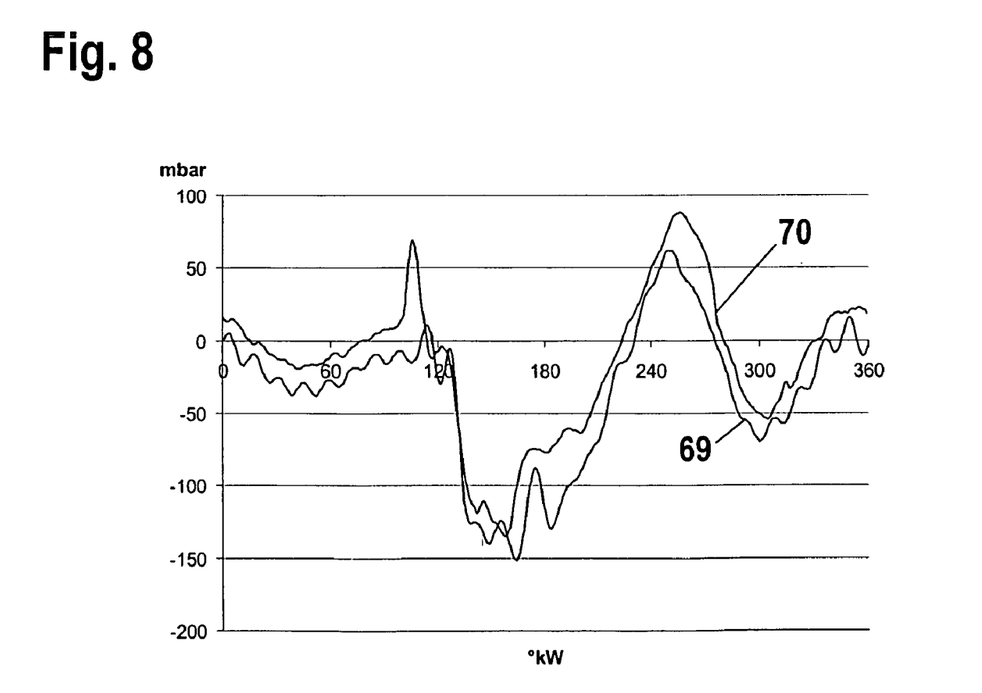
FIG. 8 is a graph showing the course of the pressure in the mixture channel and the pressure in the air channel after matching the lengths of the air channel and the mixture channel.

FIG. 8 shows the pressure 69 in the mixture channel 21 and the pressure 70 in the air channel 8 after matching the lengths of the air channel 8 and the mixture channel 21 in a manner that the pressure waves (29, 30) oscillate in phase in the air channel 8 and the mixture channel 21. As the diagram shows, the pressure 69 in the mixture channel 21 and the pressure 70 in the air channel 8 are approximately parallel so that only slight pressure differences result between the channels. The pressure 70 in the air channel 8 then lies always above or only very slightly below the pressure in the mixture channel 21 so that an induction of mixture into the air channel 8 because of the approximately equal pressure levels in the air channel 8 and the mixture channel 21 is avoided.

Figure 9:
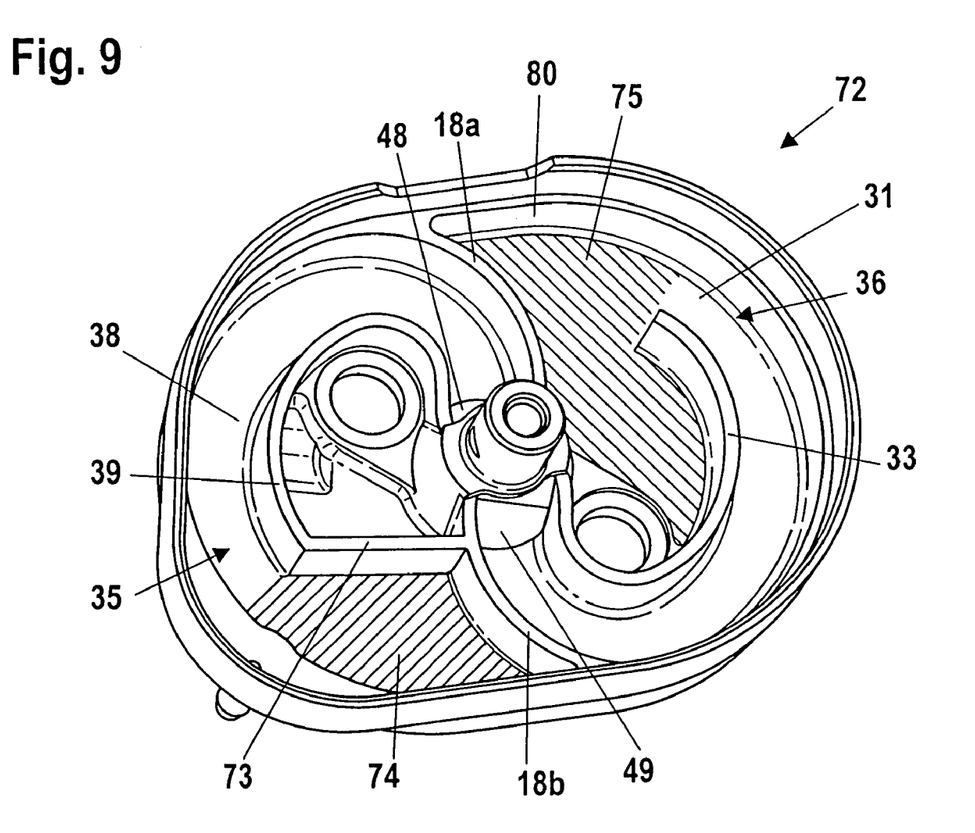
FIG. 9 is a perspective plan view of the lower shell of the housing of an air filter.

In FIG. 9, a lower shell 72 of an air filter housing 45 is shown which corresponds essentially to the lower shell 62 of FIG. 5. The same reference numerals identify corresponding components as in the previous figures. A section 38 of the mixture channel 21 is configured in the first chamber 35 in the lower shell 72 and a section 31 of the air channel 8 is configured in a second chamber 36. In the first chamber 35, a wall 73 is arranged which connects the end of the wall section 39 to the partition wall section 18b. The wall 73 delimits the section 38 of the mixture channel 21. The wall 73 can also extend in the region 74 shown hatched in FIG. 9. The pressure wave 29, which is formed in the mixture channel 21, is reflected at the wall 73. The position of the wall 73 thereby influences the amplitude of the pressure wave 29 formed in the mixture channel 21. In FIG. 9, the amplitude of the pressure wave 29 in the mixture channel 21 can be adapted by changing the position of the wall 73 in the hatched region 74.

No further wall is arranged in the second chamber 36. The pressure wave 30, which is formed in the air channel 8, is reflected at the wall 80 of the lower shell 72 of the air filter housing 45. An additional wall can be arranged in the region 75, which is shown hatched in FIG. 9, in order to influence the amplitude of the pressure wave 30 in the air channel 8. The additional wall extends especially between the wall section 33 and the partition wall section 18a or the wall 80. The amplitude of the pressure wave 30 can be influenced by the selection of the position of the wall at which the pressure wave 30 is reflected in the air channel 8. In this way, the amplitudes of the pressure waves 29 and 30 can be matched to each other by matching the positions of the walls 73 and 80.

Figure 10:
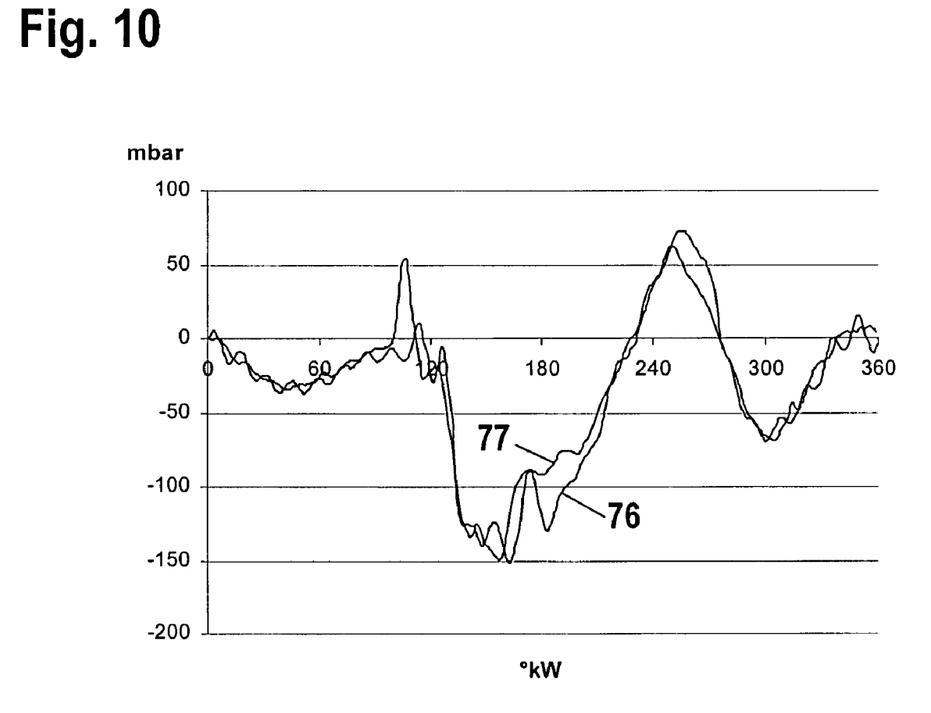
FIG. 10 is a graph showing the pressure course in the air channel and the pressure course in the mixture channel over a crankshaft angle; and, FIG. 11 is a graph showing the course of the pressure in the mixture channel and the pressure in the air channel for another arrangement of the walls in the air filter.

FIG. 10 shows the pressure course in the air channel and in the mixture channel as a function of one rotation of the crankshaft which results when utilizing the lower shell 72 of FIG. 9. The pressure 76 in the mixture channel 21 and the pressure 77 in the air channel 8 run in phase. The amplitudes of the pressure 76 in the mixture channel 21 and the pressure 77 in the air channel 8 are almost equal, more specifically, they deviate from each other by less than 20%. In this way, only slight pressure differences between the air channel 8 and the mixture channel 21 result. In this way, even for leaks between the air channel 8 and the mixture channel 21, an induction of the mixture into the air channel 8 or of air into the mixture channel 21 is substantially avoided.

Figure 11:
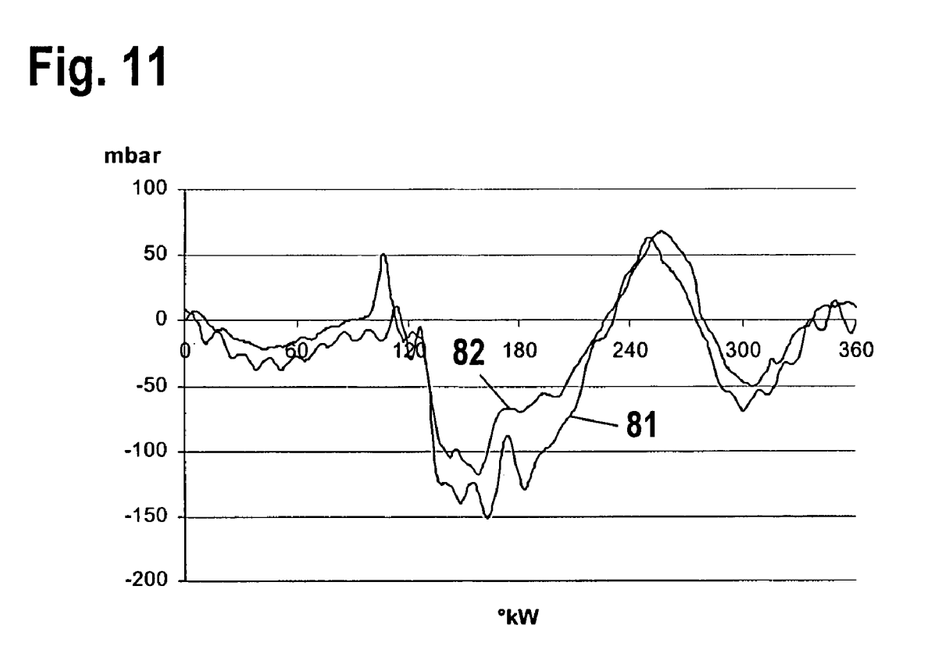

FIG. 11 shows the course of the pressure 81 in the mixture channel 21 and the course of the pressure 82 in the air channel 8 for another arrangement of the walls 73 and 80. The positions of the walls 73 and 80 at which the pressure waves 29 and 30 are reflected in the mixture channel 21 and the air channel 8 are so matched to each other that the amplitude of the pressure wave 30 in the air channel 8 is less than the amplitude of the pressure wave 29 in the mixture channel 21. In this way, the pressure 82 lies especially in the underpressure range, that is, between a crankshaft angle of 120° to approximately 220° above the pressure 81 in the mixture channel 21. In this way, the induction of mixture into the air channel can be avoided. It can, however, be advantageous that the amplitude in the air channel is greater than the amplitude in the mixture channel.

For tuning a two-stroke engine, first the length of the mixture channel 21 is designed to an optimal discharge of fuel from the fuel opening 28. Thereafter, the length of the air channel 8 is so matched to the length of the mixture channel 21 that the pressure waves in the air channel 8 and the mixture channel 21 oscillate in phase. An in-phase oscillation of the pressure waves 29 and 30 is especially wanted at full load operation. However, the frequency of the pressure waves 29 and 30 changes with a change of the rpm of the two-stroke engine so that a like phase of the pressure waves can be achieved in the air channel and the mixture channel 21 over about the entire rpm range of the two-stroke engine. The adaptation of the lengths (a, b) takes place in a simple manner via the change of the lengths of the wall sections 33 and 39. The change of the lengths can, however, also take place in the intermediate flange 22 or in the carburetor 17. Also, other components can be provided wherein a length adaptation is possible.

The amplitude of the pressure waves 29 and 30 in the mixture channel 21 and in the air channel 8 can be changed by arranging a wall at which the pressure wave is reflected. In order to achieve that the pressure waves 29 and 30 in the mixture channel 21 and in the air channel 8 have approximately equal amplitudes, the position of a wall (which wall is especially arranged in the mixture channel 21 and at which the pressure wave 29 is reflected) is adapted to the position of the wall 80 which is especially a housing wall of the air filter 41 and at which the pressure wave 30 is reflected in the air channel 8. In this way, the pressure differences between the air channel and the mixture channel are further reduced.

It is understood that the foregoing description is that of the preferred embodiments of the invention and that various changes and modifications may be made thereto without departing from the spirit and scope of the invention as defined in the appended claims.

What is claimed is:

1. A two-stroke engine assembly comprising:
a cylinder;
a piston disposed in said cylinder to undergo an up and down reciprocating movement;
said piston and said cylinder conjointly defining a combustion chamber;
an air filter;
an air channel for supplying substantially fuel-free combustion air to said cylinder with a first pressure wave developing in said air channel during operation of said two-stroke engine;
a mixture channel for supplying an air/fuel mixture to said cylinder with a second pressure wave also developing in said mixture channel during operation of said engine;
said air channel and said mixture channel connecting said cylinder to said air filter;
a component common to said air channel and said mixture channel;
a section of said air channel and a section of said mixture channel being guided in said component;
said air channel being of a first length and said mixture channel being of a second length; and,
said first length and said second length being matched to each other so as to cause said first and second pressure waves in said air channel and said mixture channel to oscillate in phase.

2. The two-stroke engine of claim 1, wherein said air channel and said mixture channel have first and second walls, respectively, whereat said first and second pressure waves are reflected.

3. The two-stroke engine of claim 2, wherein said first and second walls have first and second positions, respectively; and, said first and second positions are so matched to each other that said first and second pressure waves have approximately the same amplitude.

4. The two-stroke engine of claim 2, wherein said first and second walls are so matched to each other that said first and second pressure waves have first and second amplitudes, respectively, which are different from each other with said first amplitude being less than said second amplitude.

5. The two-stroke engine of claim 1, further comprising a partition wall for separating said air channel and said mixture channel from each other in said component common to said air channel and said mixture channel.

6. The two-stroke engine of claim 1, wherein said component is one of a carburetor and an intermediate flange.

7. The two-stroke engine of claim 1, wherein said mixture channel is extended in length into said air filter.

8. The two-stroke engine of claim 2, wherein said component is said air filter and said air filter has a raw side and a clean side; said air filter has filter material which separates said raw side from said clean side; said air channel extends into said air filter; and, wherein said two-stroke engine assembly further comprises a partition wall for separating said air channel and said mixture channel from each other with said partition wall being arranged on said clean side of said air filter.

9. The two-stroke engine of claim 8, wherein said channels define a flow direction from said air filter to said cylinder; a segment of one of said channels extends transversely to said flow direction; and, wherein said two-stroke engine assembly further comprises a chamber and a wall section; said wall section has a free end and is configured so as to extend into said chamber with said free end; and, said segment is guided in said chamber around said free end.

10. The two-stroke engine of claim 9, wherein said channels define a flow direction from said air filter to said cylinder; a segment of one of said channels is disposed in said air filter so as to extend transversely to said flow direction; the wall corresponding to said one channel at which the pressure wave is reflected is mounted in said air filter; said air filter includes a base and an intermediate cover disposed between said filter material and said base and said intermediate cover delimits said segment; and, said intermediate cover lies against said partition wall and said wall section.

11. A method of tuning a two-stroke engine assembly, said engine including: a cylinder; a piston disposed in said cylinder to undergo an up and down reciprocating movement; said piston and said cylinder conjointly defining a combustion chamber; an air filter; an air channel for supplying substantially fuel-free combustion air to said cylinder with a first pressure wave developing in said air channel during operation of said two-stroke engine; a mixture channel for supplying an air/fuel mixture to said cylinder with a second pressure wave also developing in said mixture channel during operation of said engine; said air channel and said mixture channel connecting said cylinder to said air filter; and, said air channel being of a first length and said mixture channel being of a second length; the method comprising the steps of:

matching said second length of said mixture channel to an optimal fuel discharge from said fuel port; and, matching said first length of said air channel to said second length of said mixture channel so as to cause said first pressure wave and said second pressure wave to oscillate in phase.

* * * * *